United States Patent [19]

Murao

[11] 4,451,897
[45] May 29, 1984

[54] CONTROL DEVICE WITH MODE FLAGS FOR DEDICATING MEMORY SEGMENTS AS EITHER SCRATCHPAD OR TIMING CONTROL REGISTERS

[75] Inventor: Yutaka Murao, Tokyo, Japan

[73] Assignee: Tokyo Shibaura Denki Kabushiki Kaisha, Kawasaki, Japan

[21] Appl. No.: 274,808

[22] Filed: Jun. 18, 1981

[30] Foreign Application Priority Data

Jun. 23, 1980 [JP] Japan ................................ 55-84906

[51] Int. Cl.³ .................... G06F 3/00; G06F 13/00; G06F 15/20
[52] U.S. Cl. ........................... 364/900; 364/431.04; 364/431.12
[58] Field of Search ............... 364/200, 900, 431.04, 364/431.12

[56] References Cited

U.S. PATENT DOCUMENTS

| 3,891,974 | 6/1975  | Coulter et al. ............... 364/200 |
| 4,161,787 | 7/1979  | Groves et al. ............... 364/900 |
| 4,255,789 | 3/1981  | Hartford et al. ............. 364/431.06 |
| 4,259,723 | 3/1981  | Fujisawa et al. ............. 364/431.04 |
| 4,296,722 | 10/1981 | Furuhashi et al. ............ 123/492 |
| 4,298,941 | 11/1981 | Furuhashi ................... 364/431.04 |
| 4,309,759 | 1/1982  | Tokuda et al. ............... 364/431.05 |

Primary Examiner—James D. Thomas
Assistant Examiner—Archie E. Williams, Jr.
Attorney, Agent, or Firm—Finnegan, Henderson, Farabow, Garrett & Dunner

[57] ABSTRACT

An output control device for an internal combustion engine has a plurality of registers connected to a data bus. These registers comprise registers for holding output request time data specifying when the generation of output signals will be requested, and mask data specifying whether the registers are reserved for output operations or may be used as working RAM. Other registers are provided for holding output request time data, mask data, and channel designating data specifying the output channel on which output signals will be generated. Unloading of the data in these registers is performed by sequentially supplying gate switching control signals from a shifter to gates connected to these registers. The output request time data is compared with absolute time data from a timer by a comparator, and a coincidence signal indicating coincidence detection is applied to a mask gate together with the mask data. Whether to accept the coincidence data or not is determined according to the value of the mask data. Selectors are also included for determining whether to use the coincidence signal to request an output control signal at a predetermined output channel or at an output channel designated by the channel designating data. The output request data selected through these selectors is supplied to the corresponding output port through flip-flops.

22 Claims, 24 Drawing Figures

CONTROL DEVICE WITH MODE FLAGS FOR DEDICATING MEMORY SEGMENTS AS EITHER SCRATCHPAD OR TIMING CONTROL REGISTERS

The present invention relates to an output control device suitable for engine control or the like of an automobile.

BACKGROUND OF THE INVENTION

Precision in engine control is essential with the recent demand for reducing fuel consumption and the stricter laws on regulation of exhaust gas. Engine control includes not only spark control, fuel injection control and exhaust gas recirculation control, but also opening and closing control of various valves and stepper motor control. The control as described above is generally performed with a microprocessor. As for the spark control signal among other types of control, it is preferable that the microprocessor as the controller be capable of feeding more than one independent control signal since the hardware of the distributor is often eliminated. It has been recently required to separately control each cylinder, and more than one independent fuel injection signal is thus desired. Precision on the order of several microseconds to several tens of microseconds is required for these types of control. It is thus necessary to control many completely independent signals with high precision. Flexibility is also required to respond to the different number of cylinders or different methods of control according to the automobile model.

An input/output system (to be referred to as an I/O system) has generally been accepted as a flexible general-purpose system responsive to specification changes, which compares the output time of one signal with the absolute time measured by a single timer, and which carries out a certain output process upon detection of time coincidence. However, with most of the prior art systems, the number of registers for storing the output time data is restricted to one or two registers (which is far smaller than the number of the output channels needed for control purposes) due to the need to reduce the hardware, and these registers are commonly used by many output channels in time-sharing manner. In such a case, a method for using queues for the output data must be included within the software.

This will be further described by way of examples. FIGS. 1A through 1D show prior art waveforms of engine control signals and an absolute time curve, wherein FIG. 1A shows an engine crank angle signal, FIG. 1B shows a spark signal, FIG. 1C shows a fuel injection signal, and FIG. 1D shows an absolute time curve. In these figures, SAi stands for a spark advance, ti stands for a spark-coil-on time, and Tn stands for a fuel injection pulse width. FIG. 2 shows a typical prior art engine control system 2 which obtains an engine crank angle signal from a crankshaft, and engine status signals such as engine coolant temperature from other parts of the engine, to output a spark signal and a fuel injection signal optimized for the engine status at each time.

The engine control system 2 comprises an input processing section 4 which measures the input time of an engine crank angle signal and performs analog-to-digital conversion of the engine status signal; a read-only memory 6 (to be referred to as an ROM 6) which stores a processing program for obtaining an input and producing an output; an instruction execution processor which executes this processing program, one instruction at a time; and an output control section 10 which outputs a spark signal and a fuel injection signal as output signals. The spark signal is turned ON/OFF in correspondence with the optimal spark advance and the spark-coil-on time for each crank angle signal. The optimal fuel injection signal is output once for each rotation of 360° at the position of 0° (the delay of the fuel injection signal from the 0° signal to the leading edge being constant).

Figure 1:
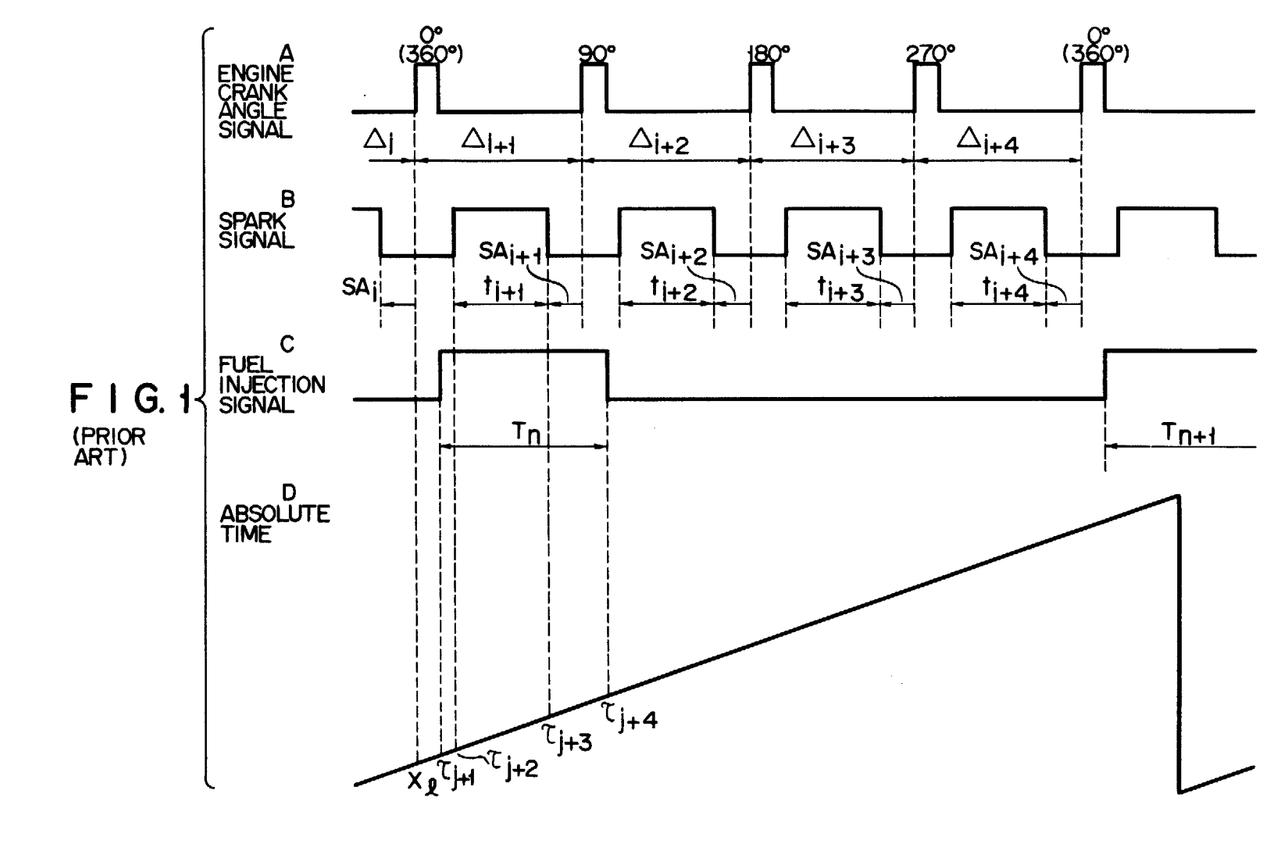
Figure 2:
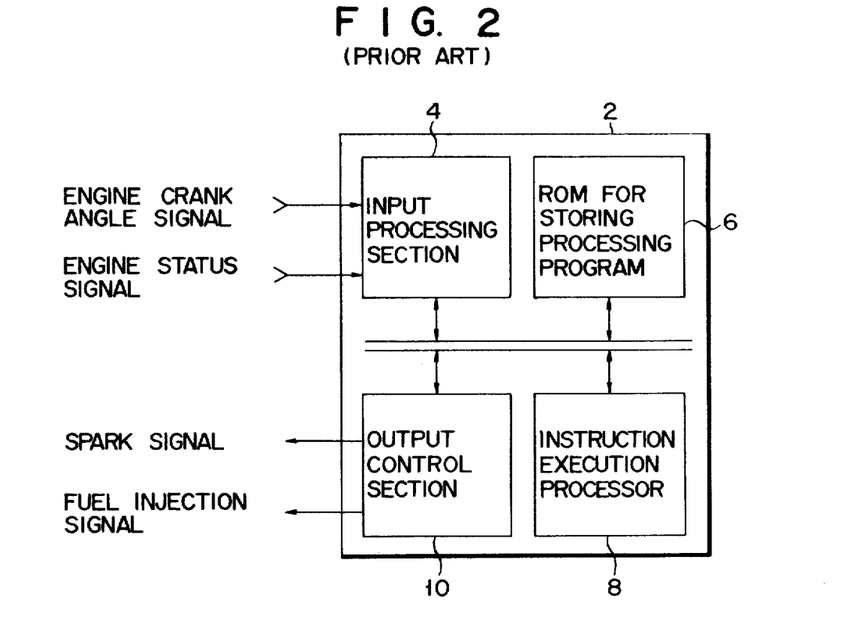
FIG. 2 is a block diagram of the engine control system according to the prior art.

Based on these assumptions, output control from $\tau_{j+1}$ to $\tau_{j+4}$ as shown in FIG. 1 will be performed according to the prior art technique. As has been described before, the prior art system involves one compare register (CREG) and one timer (TMR).

When the first crank angle 0° signal as shown in FIG. 1A is detected, the difference between the input time $X_{I-1}$ of the immediately preceding crank angle 270° signal and the input time $X_I$ of the current 0° signal is calculated to provide $\Delta i$ so that $\Delta'_{i+1} = \Delta_{i+1}$ (expected value) $= \Delta_i$ (measured value) $= X_I - X_{I-1}$. The input time may be known by reading the timer by an instruction execution processor 8 which is measuring the absolute time when the crank angle signal is detected.

As a result, the output time of the spark signal may be calculated in the following manner:

Spark ↑ time (the rise time of the spark signal) =

$$\tau_{j+2} = X_I + \Delta'_{i+1} \times \left(1 - \frac{SAi + 1}{90}\right) - t_{i+1}$$

Spark ↓ time (the fall time of the spark signal) =

$$\tau_{j+3} = X_I + \Delta'_{i+1} \times \left(1 - \frac{SAi + 1}{90}\right)$$

Similarly, the output time of the fuel injection signal is calculated in the following manner:

Fuel ↑ time (the rise time of the fuel signal) =

$$\tau_{j+1} = X_I + k \ (k: \text{constant})$$

Fuel ↓ time (the fall time of the fuel signal) =

$$\tau_{j+4} = X_I + k + Tn$$

Figure 3:
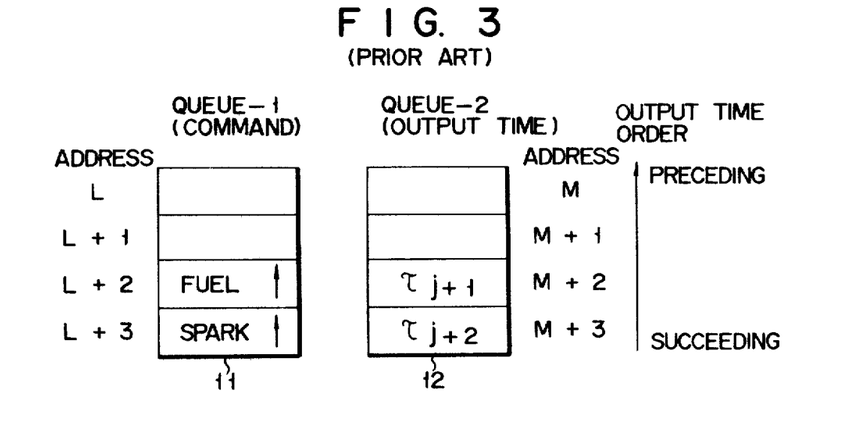
FIG. 3 is a view for explaining the queue of output times and control commands in the case of engine control with the prior art system.

With the prior art system, since only one compare register is used, at least two output times of $\tau_{j+1}$ and $\tau_{j+2}$ must be registered in a queue. In this case, the queue takes the form as shown in FIG. 3. Queue areas 11 and 12 are arranged in the random access memory area in which are stacked the commands and the output times according to the order of the output times. When the engine crank angle signal is input, $\tau j+1$ and $\tau j+2$ are newly stacked as shown in FIG. 3 (unprocessed commands are seen to be left in addresses L, L+1, M and M+1). The operation of the output control of the prior art system of this construction is performed according to the procedure of the flow charts shown in FIGS. 4 and 5.

Figure 4:
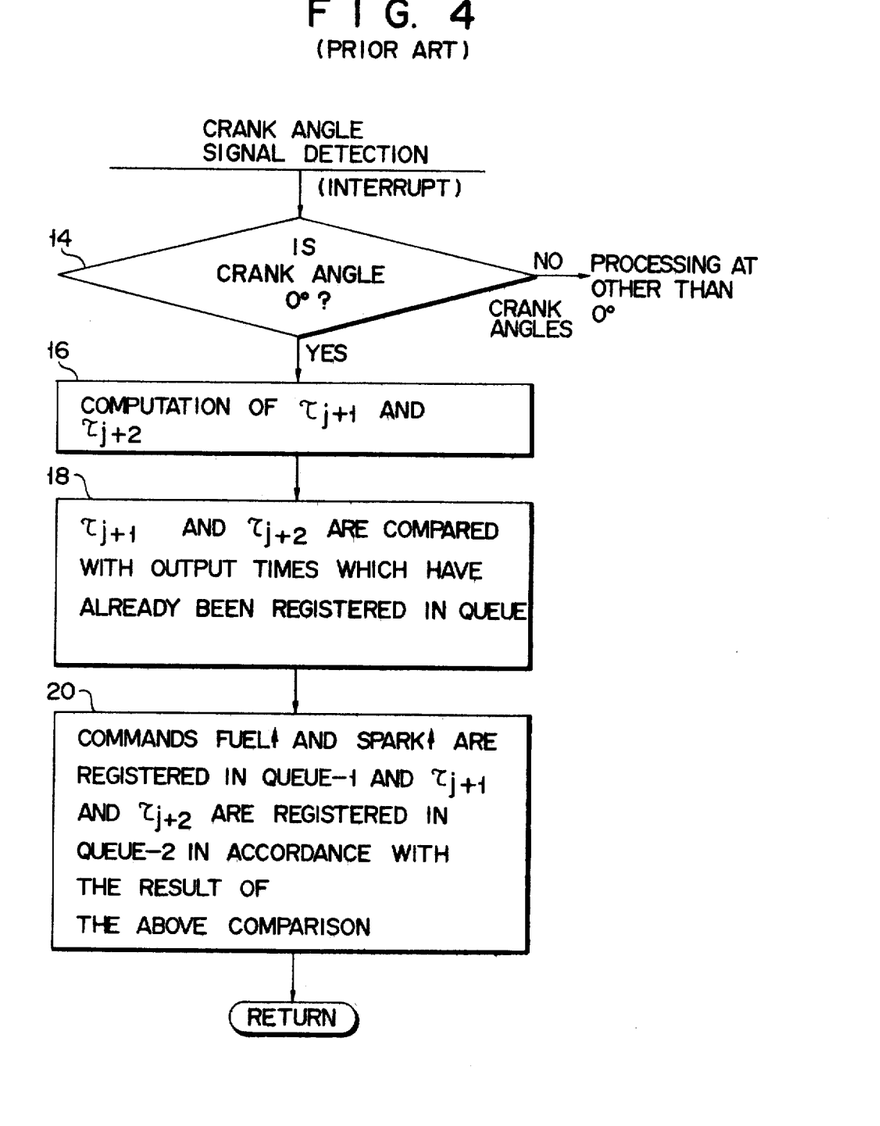
FIG. 4 is a flow chart showing the procedure for processing upon detection of a crank angle signal in the case of engine control with the prior art system.

First, in STEP 14, a judgment is made as to whether or not the engine crank angle is 0°. If the engine crank angle is 0°, the program advances to STEP 16 and the fuel → time ($\tau_{j+1}$) and the spark → time ($\tau_{j+2}$) are calculated. Then the program advances to STEP 18 wherein the times $\tau_{j+1}$ and $\tau_{j+2}$ are compared with the output times registered in the queue. This comparison determines which is earlier. The program then advances to STEP 20 wherein, based on the comparison result obtained in the preceding step, the fuel → command and the spark → command are registered in queue-1, and the times $\tau_{j+1}$ and $\tau_{j+2}$ are registered in queue-2.

Figure 5:
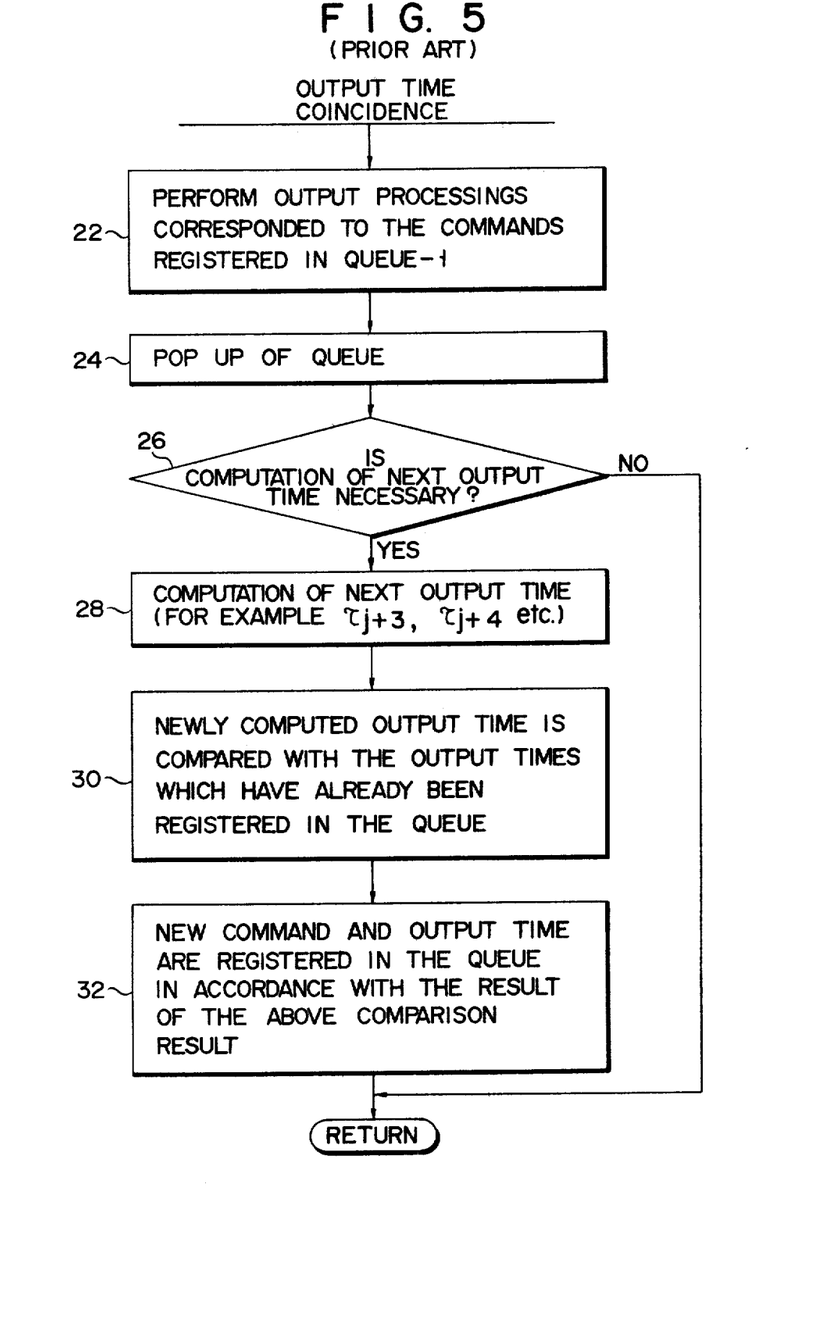
FIG. 5 is a flow chart showing the procedure for processing upon coincidence of the absolute time measured with a timer and the output time of a control signal in the case of engine control with the prior art system.

If the output time stored in the compare register coincides with the timer value in STEP 22 of FIG. 5, since the output time of the command to be output earliest and registered at the top of the queue among the commands registered in queue-1 is stored in the compare register, the output processing corresponding to this command is performed in STEP 22 of FIG. 5. Then, in STEP 24 to follow, queue-1 and queue-2 are popped up. The program then advances to STEP 26, and a judgment is made as to whether or not the calculation of the next output time is necessary. If not, NO command (no output processing) is inserted at the bottom of the queue. If the calculation of the next output times is necessary, the calculation of the next output times (e.g, $\tau_{j+3}$, $\tau_{j+4}$) is performed in STEP 28. Next, in STEP 30, the newly calculated output times are compared with the output times already registered in the queue. In STEP 32, the registering is performed according to the order of the output times.

Thus, with the prior art system, a minimum of 2×(number of output channels) RAMs must be used for the queue areas. The comparison for selecting those outputs of earlier output times and the stacking in queue are required, resulting in complex program processing.

When two output times are very close to each other, processing of the first output, pop up of the queue, and the setting of the next output time in the comparison register are necessary. The output processing of the second output time cannot be performed within the time taken by the above processing, resulting in an error and presenting a serious problem in terms of control precision.

As an alternative to the system for output control which utilizes the queue system, a system is known which utilizes many counters (e.g., each channel is provided with its own counter). This system is known as "PROGRAMMABLE TIMER MODULE COUPLED TO MICROPROCESSOR SYSTEM" and disclosed in U.S. Pat. No. 4,161,787, issued to Stanley E. Groves et al. This patent discloses a programmable module which has a counter, a latch circuit, and a control logic circuit for each channel. However, this system requires bulky hardware and lacks sufficient flexibility to allow it to be responsive to changes in the specifications. Also, this system does not include a mask function as shown in the following for designating whether or not the counts of a register are effective as an output time nor does it include a function for designating the channel.

SUMMARY OF THE INVENTION

It is an object of the present invention to provide an output control device which is capable of precision control of an engine or the like, which is flexible enough to be responsive to changes in specifications, and which is simple in both hardware and software.

In order to achieve this and other objects and in accordance with the purpose of the invention, as embodied and broadly described herein, the present invention provides an output control device comprising for storing output time data and mask data, first means connected to the plurality of registers for retrieving the mask data and the output time data stored in the registers, and a timer for producing a value representative of actual time. Means are provided for comparing the contents of the timer and the output time data retrieved from the registers and for generating a coincidence signal in response to a coincidence of contents of the timer and the retrieved output time data. Second means are also provided for determining whether to use a particular register as a register which holds output time data or as a working random acess memory location.

The present invention adopts an I/O system which compares an output time of a signal with the absolute time measured by a timer as a reference, and which performs the output control processing upon detection of coincidence between the above two times. Therefore, the system according to the present invention works well for general purposes and is responsive to changes in specifications. Further, the system of the present invention is suitable for multi-output and high precision control while reducing the amount of software and hardware. Providing a, queue for software is not necessary, nor is it necessary to incorporate RAMs in association with the registers for storing the respective output times for calculating the next output time.

Since the output times from the registers for storing these output times are supplied to the comparator on a time-sharing basis and the comparing operation is performed without requiring control by the microprocessor, the load on the microprocessor is reduced. Additionally, according to the present invention, the registers for storing the output times include mask fields for selecting whether or not the comparison results is to be effective. Therefore, the registers for storing the output times may be treated as the working RAM by clearing the mask data of the corresponding registers even when the number of output channels for control is small.

Since the registers for storing the output times include channel designating fields, the simultaneous output through many channels for engine control may be achieved by, for example, placing the two channel designating fields of a certain register at logic high level, as will become clearer hereinafter. A request for outputting pulses of narrow width through one channel may also be achieved by storing the two output times in the two registers and setting the channel designation fields of each of those two registers to designate its channel. In this manner, two output requests may be obtained at an interval which is shorter than the processing resolution of the microprocessor through one channel, so that more precise control of the engine may be performed.

Other objects and features of present invention will be apparent from the following description taken in connection with the accompanying drawings in which:

BRIEF DESCRIPTION OF THE DRAWING

FIG. 1 shows timing charts of control signals during engine control of an automobile according to the prior art system wherein FIG. 1A is a timing chart of the engine crank angle signal, FIG. 1B is a timing chart of the spark signal, FIG. 1C is a timing chart of the fuel injection signal, and FIG. 1D is a timing chart of the absolute time.

FIGS. 9A through 9N are timing charts showing the operations of the control logic shown in FIG. 7 and the selector shown in FIG. 8 wherein

DESCRIPTION OF THE PREFERRED EMBODIMENT

Figure 6:
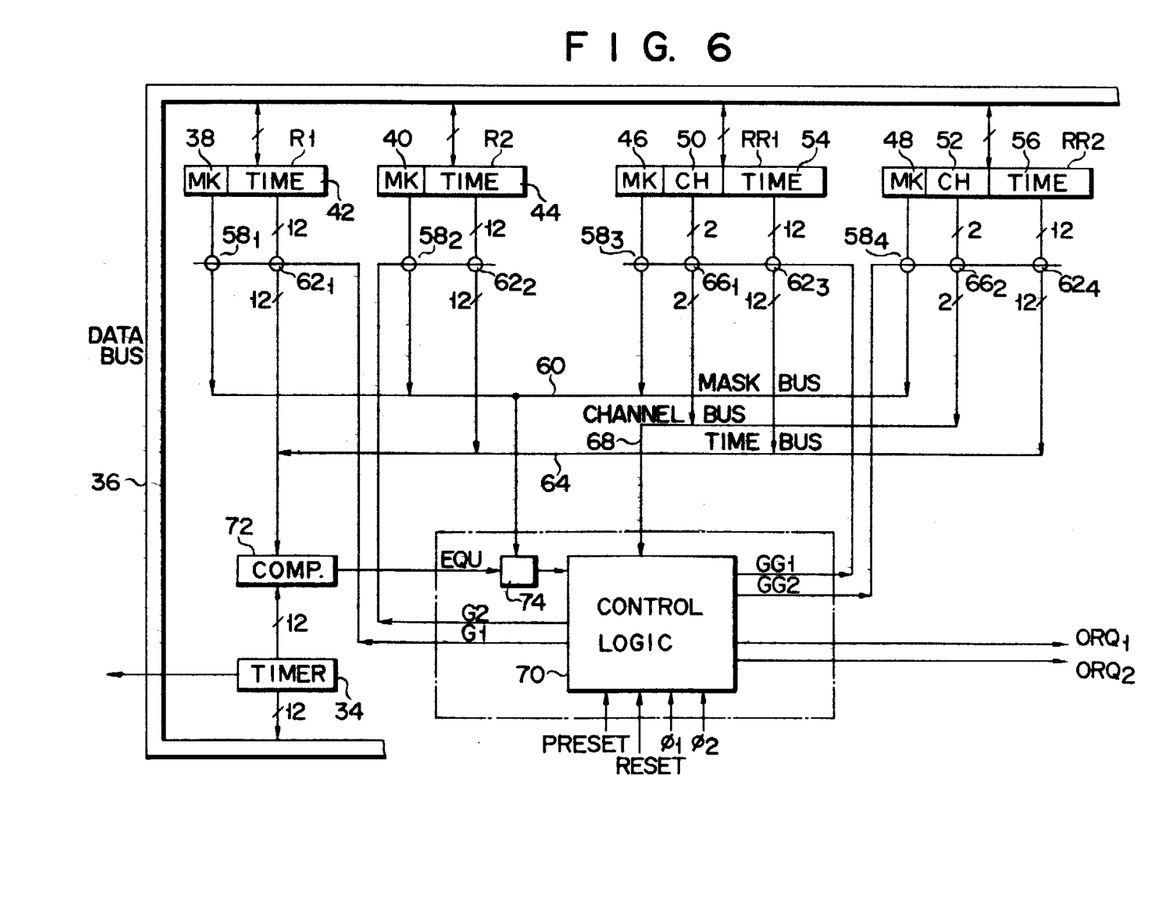
FIG. 6 is a block diagram showing an embodiment of the present invention.

FIG. 6 is a block diagram according to an embodiment of the present invention. Referring to this figure, a timer 34 is a free-running counter which displays the absolute time. The output of timer 34 may be read through an internal data bus 36 so that the current value of the absolute time may be known. Registers R1 and R2 are registers for storing mask data 38, 40, and output time data 42, 44, respectively. Registers RR1 and RR2 are registers for storing the mask data 46, 48, channel designating data 50, 52, and the output time data 54, 56, respectively. The mask data is a flag of 1-bit construction for judging whether or not each of the output times stored in the registers R1, R2, RR1, or RR2 is to be effective. According to this embodiment, when the mask data is logic level "1", for example, the output time data is judged to be effective; and when the mask data is logic level "0", the output time data is judged to be ineffective. The respective mask data for the registers R1, R2, RR1 and RR2 are output onto a mask bus 60 through transmission gates $58_1$, $58_2$, $58_3$ and $58_4$, respectively.

The respective output time data of the registers R1, R2, RR1 and RR2 are output onto a time bus 64 through transmission gates $62_1$, $62_2$, $62_3$ and $62_4$, respectively. The channel data 50, 52 of the registers RR1 and RR2 are of 2-bit construction according to this embodiment so that either or both of channel 1 (CH1) and channel 2 (CH2) may be designated. Thus, when either bit is logic level "1", the channel corresponding to this bit is selected. When both bits are logic level "1", both channels 1 and 2 are selected. These channel data are output onto a channel bus 68 through transmission gates $66_1$ and $66_2$, respectively.

Gates $58_1$ through $58_4$, $62_1$ through $62_4$, and $66_1$ through $66_4$ are so controlled that the mask data and the output time data of the registers R1 and R2, and the mask data, the channel designating data and the output time data of the registers RR1 and RR2, may be output on a time-sharing basis on the mask bus 60, the channel bus 68, and the time bus 64. These gates $58_1$ through $58_4$, $62_1$ through $62_4$, and $66_1$ and $66_2$ are controlled by a control logic 70 to be described hereinafter. The output time data output on the time bus 64 is supplied to the input terminal of a comparator 72. The output of the timer 34 is supplied to the other input terminal of the comparator 72 for comparison. When the two inputs coincide with each other, the comparator 72 outputs a coincidence signal which is supplied to a mask gate 74. A control signal for opening or closing the mask gate 74 is supplied from the mask bus 60. Therefore, when the mask data is logic level "1", the mask gate 74 opens so that the coincidence data is supplied to the control logic 70.

The control logic 70 outputs gate control signals G1, G2, GG1, and GG2. The gate control signal G1 controls the transmission gates $58_1$ and $62_1$, and the gate control signal G2 controls the transmission gates $58_2$ and $62_2$. The gate control signal GG2 controls the transmission gates $58_3$, $66_1$ and $62_3$ and the gate control signal GG2 controls the transmission gates $58_4$, $66_2$, and $62_4$. Input signals $\phi 1$, $\phi 2$, PRESET, and RESET are supplied to the control logic 70. The input signals $\phi 1$ and $\phi 2$ are basic clock signals of the system. The PRESET signal is used to initialize the control logic 70, and the RESET signal is used to clear the output request. The control logic 70 outputs output request signals ORQ1 and ORQ2.

Figure 7:
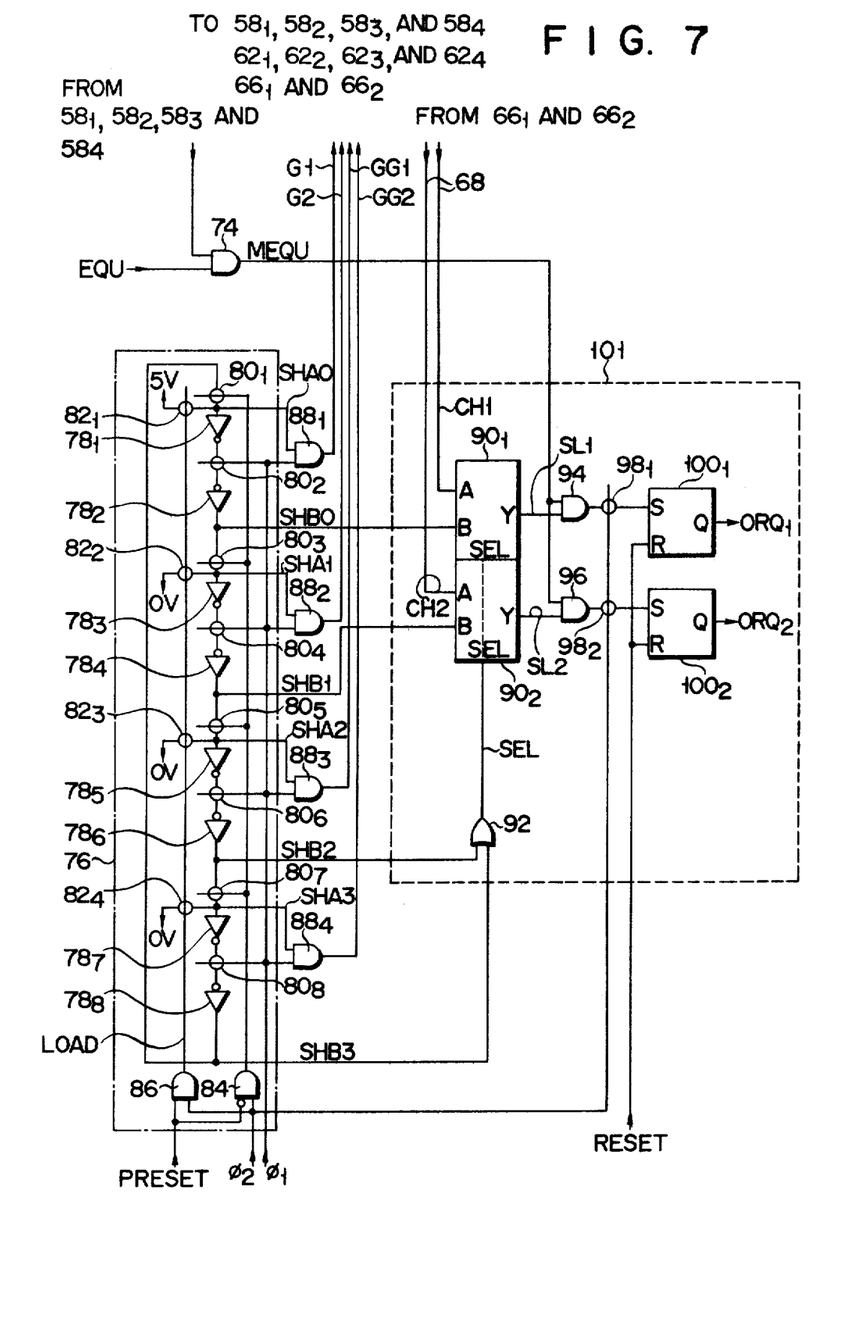
FIG. 7 is a detailed circuit diagram of the control logic shown in FIG. 6.

FIG. 7 is a circuit diagram showing the details of the control logic 70 of FIG. 6. Referring to this figure, part 76 enclosed by an alternate long and short dash line is a shifter. This shifter 76 is a ring shifter which may be preset and indicates which one of the registers, R1, R2, RR1 or RR2, is selected. This shifter 76 comprises 8 inverters $78_1$ to $78_8$, a first group of transmission gates $80_1$ to $80_8$, a second group of transmission gates $82_1$ to $82_4$, and AND gates 84 and 86. The basic clock signal $\phi 1$ is supplied to the transmission gates $80_2$, $80_4$, $80_6$, and $80_8$ among the first group of transmission gates for controlling them. The basic clock signal $\phi 2$ is supplied to the transmission gates $80_1$ $80_3$, $80_5$, and $80_7$ among the first group of transmission gates for controlling them. The clock signal $\phi 2$ is supplied through the AND gate 86 to the transmission gates $82_1$ to $82_4$ of the second group of transmission gates for controlling them in synchronism with the PRESET signal. The PRESET signal is applied to the other input terminal of the AND gate 84 through the inverter.

Therefore, when the PRESET signal is logic low level and the basic clock signal $\phi 2$ is logic high level, the transmission gates $80_1$, $80_3$, $80_5$ and $80_7$ among the first group of transmission gates are opened. The output signals of the transmission gates $80_1$, $80_3$, $80_5$ and $80_7$ are supplied to one input terminal of respective AND gates $88_1$, $88_2$, $88_3$ and $88_4$. The clock signal $\phi 1$ is supplied to the other input terminals of these AND gates $88_1$, $88_2$, $88_3$ and $88_4$. As a result, the AND gates $88_1$, $88_2$, $88_3$ and $88_4$ pass the gate control signals G1, G2, GG1 and GG2 in synchronism with the clock signal $\phi 1$.

Outputs SHB0 and SHB1 of the inverters $78_2$ and $78_4$ are supplied to input terminals B of a first selector $90_1$ and a second selector $90_2$. Channel data CH1 and CH2 are supplied to input terminals A of the selectors $90_1$ and $90_2$ through the channel bus 68. As for the function of these selectors $90_1$ and $90_2$, a select signal SEL is obtained from an OR gate 92 so that the output of the shifter 76 is selected when the gate signals G1 and G2 are applied, and the channel bus 68 is selected when the gate signals GG1 and GG2 are applied. In accordance with this embodiment, the A input is selectively output to an output terminal Y when this SEL signal is logic level "1", and the B input is selected when the SEL signal is logic level "0". Outputs of the selectors $90_1$ and $90_2$ are applied to inputs terminals of AND gates 94 and 96 respectively. A coincidence signal (MEQU signal) output from the comparator 72 is applied through the mask gate 74 to the other input terminal of each of the AND gates 94 and 96.

These AND gates supply the Y outputs of the selectors $90_1$ and $90_2$ to a third group of transmission gates $98_1$ and $98_2$ in synchronism with the MEQU signal. These transmission gates $98_1$ and $98_2$ are controlled by the clock signal $\phi 2$ and supply the output signals of the selectors $90_1$ and $90_2$ through the AND gates 94 and 96 to the set inputs of a first RS flip-flop $100_1$ and a second RS flip-flop $100_2$. Consequently, these flip-flops $100_1$ and $100_2$ are set, and signals ORQ1 and ORQ2 are output from the respective output terminals Q. These flip-flops $100_1$ and $100_2$ are reset by the RESET signal applied to the reset terminals. Part 101 enclosed by the dotted line in FIG. 7 determines whether the signal representing coincidence detection is to be received at the output ports corresponding to R1, R2 or at the output ports designated by the channel designating data of RR1, RR2.

Figure 8:
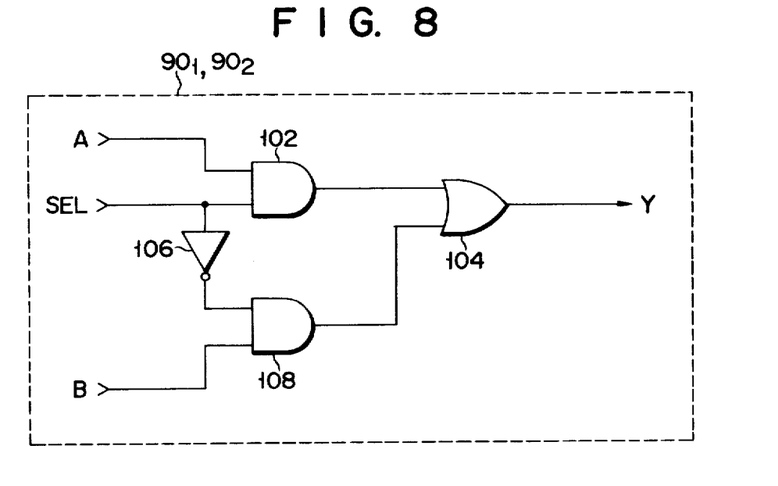
FIG. 8 is a detailed circuit diagram of a selector shown in FIG. 7.

FIG. 8 is a detailed circuit diagram of the selectors $90_1$ and $90_2$. The A input is applied to one input terminal of an AND gate 102, and the B input is applied to one input terminal of an AND gate 108. The SEL signal is applied to the other input terminal of the AND gate 102, and the inverted signal of the SEL signal is applied to the other input terminal of the AND gate 108 through an inverter 106. Both outputs of these AND gates 102 and 108 are applied to the output terminals Y through an OR gate 104. When the SEL signal is logic level "1", the A input is obtained at the output terminals Y through the AND gate 102 and the OR gate 104. When the SEL signal is "0", the B input is obtained at the output terminals Y by the inverter 106 through the AND gate 108 and the OR gate 104.

Figure 9:
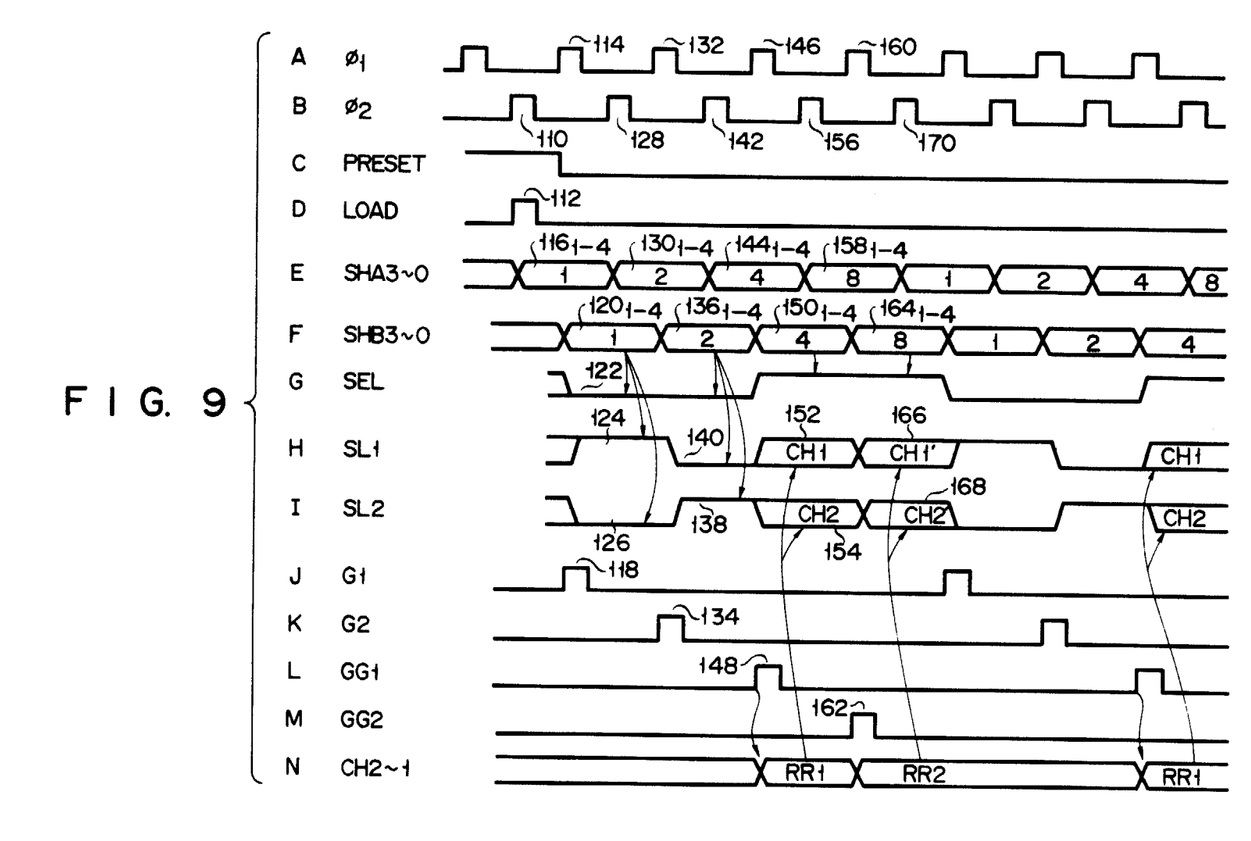
FIG. 9A is a timing chart of a basic clock $\phi 1$ input to the control logic.
FIG. 9B is a timing chart of a basic clock $\phi 2$.
FIG. 9C is a timing chart of a PRESET signal.
FIG. 9D is a timing chart of a LOAD signal.
FIG. 9E is a timing chart of output signals SHA0 to SHA3 of the shifter.
FIG. 9F is a timing chart of the output signals SHB0 to SHB3 of the shifter.
FIG. 9G is a timing chart of a SEL signal input to the selector.
FIGS. 9H and 9I are timing charts of output signals SL1 and SL2 of a first selector and a second selector.
FIGS. 9J to 9M are timing charts of gate controls signals G1, G2, GG1, and GG2.
FIG. 9N is a timing chart of signals CH1 and CH2 input to the first and second selectors.

FIGS. 9A through 9N are timing charts of the circuit shown in FIGS. 7 and 8. FIG. 9A is a timing chart of the clock signal $\phi 1$, FIG. 9B is a timing chart of the clock signal $\phi 2$, FIG. 9C is a timing chart of the PRESET signal, FIG. 9D is a timing chart of the LOAD signal, FIG. 9E is a timing chart of output signals SHA0 to SHA3 of the shifter 76, FIG. 9F is a timing chart of output signals SHB0 to SHB3 of the shifter 76, FIG. 9G is a timing chart of the SEL signal input to the selectors $90_1$ and $90_2$, FIGS. 9H and 9I are timing charts of output signals SL1 and SL2 of the first and second selectors, FIGS. 9J to 9M are timing charts of the gate control signals G1, G2, GG1 and GG2 respectively, and FIG. 9N is a timing chart of signals CH1 and CH2 input to the first and second selectors $90_1$ and $90_2$.

The mode of operation of the embodiment shown in FIG. 7 will be described with reference to these timing charts. First, pulse 110 of the clock signal $\phi 2$ shown in FIG. 9B is applied to one input terminal of the AND gate 86 as well as to one input terminal of the AND gate 84. The PRESET signal of high level as shown in FIG. 9C is applied to the other input terminal of the AND gate 86, and the PRESET signal inverted by the inverter is applied to the other input terminal of the AND gate 84. As a result, the AND gate 86 is opened, and the PRESET signal is applied as pulse 112 of the LOAD signal as shown in FIG. 9D to the gates $82_1$, $82_2$, $82_3$ and $82_4$. At this instant, the AND gate 84 is closed. As a result, the logic values "1", "0", "0", and "0" are set in the shifter 76, and pulses $116_{1-4}$ of SHA0, SHA1, SHA2 and SHA3 shown in FIG. 9E are applied to one input terminal each of the AND gates $88_1$, $88_2$, $88_3$ and $88_4$.

Next, pulse 114 of the clock signal $\phi 1$ is applied to the other input terminal each of the AND gates $88_1$, $88_2$, $88_3$ and $88_4$. As a result, the AND gate $88_1$ outputs a signal of logic high level, and the AND gates $88_2$, $88_3$ and $88_4$ output signals of logic low level, respectively. Consequently, pulse 118 of the signal G1 as shown in FIG. 9J is output from the AND gate $88_1$. The pulse 118 of G1 is applied to the transmission gates $58_1$ and $62_1$ to open these transmission gates $58_1$ and $62_1$. The output time data 42 set in the register R1 is thus supplied to one input terminal of the comparator 72 through the time bus 64. On the other hand, the mask data of the register R1 is applied to the mask gate 74 through the mask bus 60. The absolute time data from the timer 34 is supplied to the other input terminal of the comparator 72 for performing a comparison. When a coincidence is detected as a result of the comparison, the coincidence signal (EQU signal) of the comparator 72 is applied to one input terminal of the mask gate 74. If the mask data 38 is logic high level (the comparison result of the output time data 42 at the comparator 72 is masked off when the mask data 38 is logic low level), the signal of logic high level is input to the mask gate (AND gate) 74 shown in FIG. 7. Therefore, the mask gate 74 makes the coincidence signal (MEQU signal) to high level and this high level signal is applied to one input terminal each of the AND gates 94 and 96. Since the clock pulse 114 of $\phi 1$ is applied to the transmission gates $80_2$, $80_4$, $80_6$ and $80_8$, these transmission gate are opened. Pulse $120_{1-4}$ of the signal SHB0 becomes logic high level and signals SHB1 to SHB3 become logic low level at a timing as shown in FIG. 9F. Then, the signal of logic high level is applied to the input terminal B of the selector $90_1$ and the signal of logic low level is applied to the input terminal B of the selector $90_2$. Since the pulse 122 of the SEL signal of logic low level as shown in FIG. 9G is applied to the respective SEL input terminals of the selectors, the selectors $90_1$ and $90_2$ select the B input (according to the present invention, the input A is selected when the SEL signal is logic high level and the input B is selected when the SEL signal is logic low level). Pulse 124 of the SL1 signal of logic high level as shown in FIG. 9H is output from the output terminal Y of the selector $90_1$ which is applied to the other input terminal of the AND gate 94. Pulse 126 of the SL2 signal as shown in FIG. 9I is output from the output terminal Y of the selector $90_2$ which is applied to the other input terminal of the AND gate 96. As a result, the AND gate 94 passes the MEQU signal, and the AND gate 96 inhibits the passing of the MEQU signal. As a result, the MEQU signal of logic high level is applied to the transmission gate $98_1$. Second pulse 128 of the clock signal $\phi 2$ opens the transmission gate $98_1$ and is supplied to the set terminal of the flip-flop $100_1$ for setting it. Then, the flip-flop $100_1$ outputs an output request signal ORQ1 to the terminal Q. If no time coincidence is detected and the MEQU signal is logic low level, the flip-flop $100_1$ is not set.

Since the preset signal is logic low level at this instant, it is inverted by the inverter, and the signal of logic high level is input to the AND gate 84. As a result, the AND gate 84 passes pulse 128 of the clock signal $\phi 2$ to be applied to the transmission gates $80_1$, $80_3$, $80_5$ and $80_7$. These transmission gates $80_1$, $80_3$, $80_5$ and $80_7$ are opened so that the data stored in the shifter 76 is shifted. The logic values of "0", "1", "0" and "0" are set in the shifter 76, and pulses $130_{1-4}$ of the signals SHA0, SHA1, SHA2 and SHA3 shown in FIG. 9E are applied to one input terminal each of the AND gates $88_1$, $88_2$, $88_3$ and $88_4$ respectively. Second pulse 132 of $\phi 1$ as shown in FIG. 9A is applied to the other input terminal each of the AND gates $88_1$, $88_2$, $88_3$ and $88_4$. The AND gate $88_2$ outputs a signal of logic high level, and the other AND gates $88_1$, $88_3$ and $88_4$ output signals of logic low level, respectively. Thus, pulse 134 of the signal G2 as shown in FIG. 9K is output from the AND gate $88_2$.

The pulse 134 of the signal G2 is applied to the transmission gates $58_2$ and $62_2$ to open these gates. The time data 44 set in the register R2 is then supplied to one input terminal of the comparator 72 through the time bus 64. On the other hand, the mask data 40 of the register R2 is supplied to the mask gate 74 through the mask bus 60. The absolute time data from the timer 34 is supplied to the other input terminal of the comparator 72 for comparison. When a coincidence is detected, the coincidence output (EQU signal) from the comparator 72 is applied to one input terminal of the mask gate 74. When the mask data 40 is logic high level, signals of logic high level are input to both input terminals of the mask gate 74 shown in FIG. 7 so that the mask gate 74 makes the coincidence signal (MEQU signal) high level which is then applied to one input terminal each of the AND gates 94 and 96. Pulse 132 of the clock signal $\phi 1$ is applied to the transmission gates $80_2$, $80_4$, $80_6$ and $80_8$ to open these gates. Pulse $136_1$ of the signal SHB1 becomes logic high level, and the signals SHB0, SHB2 and SHB3 become logic low level, respectively, at a timing shown in FIG. 9F. The signal of logic high level is applied to the input terminal B of the selector $90_2$, and the signal of logic low level is applied to the input terminal B of the selector $90_1$. On the other hand, since the pulse 122 of the SEL signal shown in FIG. 9G is applied to the SEL input terminals of the selectors $90_1$ and $90_2$, the selectors $90_1$ and $90_2$ select the B input. Pulse 138 of the signal SL2 of logic high level as shown in FIG. 9I is output from the output terminal Y of the selector $90_2$ and is applied to the other input terminal of the AND gate 96. Pulse 140 of the SL1 signal of low level as shown in FIG. 9H is output from the output terminal Y of the selector $90_1$ and is applied to the other input terminal of the AND gate 94. Thus, the AND gate 96 passes the MEQU signal, and the AND gate 94 inhibits the passing of the MEQU signal. The MEQU signal of logic high level is applied to the transmission gate $98_2$. The transmission gate $98_2$ is opened by third pulse 142 of the clock signal $\phi 2$ which is supplied to the set terminal of the flip-flop $100_2$ to set the flip-flop $100_2$. As a result, the flip-flop $100_2$ outputs an output request signal ORQ2. If the time coincidence is not detected and the MEQU signal is low level, the flip-flop $100_2$ is not set.

Since the PRESET signal is logic low level at this instant, it is inverted by the inverter so that signals of logic high level are input to both the input terminals of the AND gate 84. Consequently, the AND gate 84 passes pulse 142 of the clock signal $\phi 2$ to apply it to the transmission gates $80_1$, $80_3$, $80_5$ and $80_7$. These transmission gates $80_1$, $80_3$, $80_5$ and $80_7$ are opened and the data in the shifter 76 is shifted. Logic values "0", "0", "1" and "0" are set in the shifter 76, and pulses $144_{1-4}$ each of the signals SHA0, SHA1, SHA2 and SHA3 are applied to one input terminal each of the AND gates $88_1$, $88_2$, $88_3$ and $88_4$ respectively. Next, third pulse 146 of the clock signal $\phi 1$ shown in FIG. 9A is applied to the other input terminal each of the AND gates $88_1$, $88_2$, $88_3$ and $88_4$. The AND gate $88_3$ outputs a signal of logic high level, and the other AND gates $88_1$, $88_2$ and $88_4$ output signals of logic low level, respectively.

As a result, pulse 148 of the signal GG1 as shown in FIG. 9L is output from the AND gate $88_3$. Pulse 148 of the signal GG1 is applied to the transmission gates $58_3$, $66_1$ and $62_3$ to open them. Output time data 54 set in the register RR1 is supplied to one input terminal of the comparator 72 through the time bus 64, the mask data 46 is supplied to the mask gate 74 through the mask bus 60, and the channel data 50 is supplied to the input terminals A of the selectors $90_1$ and $90_2$ shown in FIG. 7 through the channel bus 68 at a timing shown in FIG. 9N. The absolute time data from the timer 34 is supplied to the other input terminal of the comparator 72 for comparison. When the comparison indicates that the inputs coincide, the coincidence signal (EQU signal) from the comparator 72 is applied to one input terminal of the mask gate 74. At this instant, if the mask data 46 is logic high level, a signal of logic high level is input to the mask gate 74 shown in FIG. 7 so that the mask gate 74 makes the coincidence output signal (MEQU signal) high level which is applied to one input terminal each of the AND gates 94 and 96.

On the other hand, third pulse 146 of the clock signal $\phi 1$ is applied to the transmission gates $80_2$, $80_4$, $80_6$ and $80_8$ to open them. Consequently, pulse $150_3$ of the signal SHB2 becomes logic high level and the signals SHB0, SHB1 and SHB3 become logic low level, respectively, at a timing shown in FIG. 9F. Pulse $150_3$ of the signal SHB2 is applied to the SEL input terminals of the selectors $90_1$ and $90_2$ through the OR gate 92. The selectors $90_1$ and $90_2$ then select the A input. If the channel 1 data (CH1) of the channel data 50 is logic high level and the channel 2 data (CH2) is logic low level, pulse 152 of the signal SL1 of logic high level as shown in FIG. 9H is output from the output terminal Y of the selector $90_1$ and is applied to the other input terminal of the AND gate 94. Pulse 154 of the signal SL2 of logic low level as shown in FIG. 9I is output form the output terminal Y of the selector $90_2$ and is applied to the other input terminal of the AND gate 96. The AND gate 94 then passes the MEQU signal, and the AND gate 96 inhibits the passing of the MEQU signal. Thus, the MEQU signal of high level is applied to the transmission gate $98_1$, and fourth pulse 156 of the clock signal $\phi 2$ opens the transmission gate $98_1$ and is supplied to the set terminal of the flip-flop $100_1$ to set it. The flip-flop $100_1$ outputs the output request signal ORQ1. If the time coincidence is not detected and the MEQU signal is logic low level, the flip-flop $100_1$ is not set.

If the channel data CH1 is logic low level and CH2 is logic high level, the selector $90_2$ outputs pulse 154 of the signal SL2 of logic high level as shown in FIG. 9I from the output terminal Y and applies it to the other input terminal of the AND gate 96. Pulse 152 of the signal SL1 of logic low level as shown in FIG. 9H is output from the output terminal Y of the selector $90_1$ and is applied to the other input terminal of the AND gate 94. The AND gate 96 then passes the MEQU signal and the AND gate 94 inhibits the passing of the MEQU signal. Therefore, the MEQU signal of logic high level is applied to the transmission gate $98_2$. Fourth pulse 156 of the clock signal $\phi 2$ opens the transmission gate $98_2$ and is supplied to the set terminal of the flip-flop $100_2$ to set it. Consequently, the flip-flop $100_2$ outputs the output request signal ORQ2. If the time coincidence is not detected and the MEQU signal is logic low level, the flip-flop $100_2$ is not set.

On the other hand, if the two bits of the channel data 50 are both logic high level, pulse 152 of the signal SL1 of logic high level and pulse 154 of signal SL2 of logic high level are applied to the AND gartes 94 and 96 so that the signals ORQ1 and ORQ2 are output from the flip-flops $100_1$ and $100_2$, respectively.

Since the PRESET signal described hereinabove is logic low level, it is inverted by the inverter 106 so that signals of logic high level are supplied to both the input terminals of the AND gate 84. The AND gate 84 thus passes pulse 156 of the clock signal $\phi 2$ and applies it to the transmission gates $80_1$, $80_3$, $80_5$ and $80_7$. These transmission gates $80_1$, $80_3$, $80_5$ and $80_7$ are then opened and the data in the shifter 76 is shifted.

Logic values "0", "0", "0" and "1" are set in the shifter 76, and pulses $158_{1-4}$ each of the signals SHA0, SHA1, SHA2 and SHA3 respectively are applied to one input terminal each of the AND gates $88_1$, $88_2$, $88_3$ and $88_4$, respectively. Fourth pulses 160 of the clock signal $\phi 1$ as shown in FIG. 9A is applied to the other input terminal each of the AND gates $88_1$, $88_2$, $88_3$ and $88_4$. As a result, the AND gate $88_4$ outputs a signal of logic high level, and the other AND gates $88_1$, $88_2$ and $88_3$ output signals of logic low level, respectively. Pulse 162 of the signal GG2 as shown in FIG. 9M is output from the AND gate $88_4$. Thus, the pulse 162 of the signal GG2 is applied to the transmission gates $58_4$, $66_2$ and $62_4$ to open these gates. The output time data 56 set in the register RR2 is then supplied to one input terminal of the comparator 72 through the time bus 64. The mask data 48 is supplied to the mask gate 74 through the mask bus 60. The channel data 52 is supplied to the input terminal A each of the selectors $90_1$ and $90_2$, as shown in FIG. 7, through the channel bus 68 at a timing as shown in FIG. 9N. The absolute time data from the timer 34 is supplied to the other input terminal of the comparator 72 for comparison. When the comparison indicates that the inputs coincide, the coincidence signal (EQU signal) from the comparator 72 is applied to one input terminal of the mask gate 74. At this instant, if the mask data 48 is logic high level, signals of logic high level are supplied to both input terminals of the mask gate 74 shown in FIG. 7 so that the mask gate 74 makes the coincidence output signal (MEQU signal) logic high level and applies it to one input terminal each of the AND gates 94 and 96.

Fourth pulse 160 of the clock signal $\phi 1$ is applied to the transmission gates $80_2$, $80_4$, $80_6$ and $80_8$ to open them. Thus, pulse $164_4$ of the signal SHB3 becomes logic high level and pulses $164_1$ to $164_3$ of the signals SHB0, SHB1 and SHB2 become logic low level, respectively, at a timing shown in FIG. 9F. Pulse $164_4$ of the signal SHB3 is applied to the SEL input terminal each of the selectors $90_1$ and $90_2$ through the OR gate 92. The selectors $90_1$ and $90_2$ select the input terminals A. If the channel 1 data (CH1) of the channel data 52 is logic high level and the channel 2 data (CH2) is low level, the selector $90_1$ outputs pulse 166 of the signal SL1 of logic high level, as shown in FIG. 9H, from the output terminal Y and applies it to the other input terminal of the AND gate 94. Pulse 168 of the signal SL2 of logic low level, as shown in FIG. 9I, is output from the output terminal Y of the selector $90_2$ and is applied to the other input terminal of the AND gate 96. The AND gate 94 then passes pulse 166 of the coincidence output MEQU signal and the AND gate 96 inhibits the passing of the MEQU signal. The MEQU signal of logic high level is applied to the transmission gate $98_1$. Fifth pulse 170 of the clock signal $\phi 2$ opens the transmission gate $98_1$ and is supplied to the set terminal of the flip-flop $100_1$ to set it. The flip-flop $100_1$ then outputs the output request signal ORQ1.

On the other hand, if the channel data CH1 is logic low level and CH2 is logic high level, the selector $90_2$ outputs pulse 168 of the signal SL2 of logic high level, as shown in FIG. 9I, from the output terminal Y and applies it to the other input terminal of the AND gate 96. Pulse 166 of the signal SL1 of logic low level as shown in FIG. 9H is output from the output terminal Y of the selector $90_1$ and is applied to the other input terminal of the AND gate 94. As a result, the AND gate 96 passes the MEQU signal, and the AND gate 94 inhibits the passing of the MEQU signal. The MEQU signal of logic high level is applied to the transmission gate $98_2$. The fifth pulse 170 of the clock signal $\phi 2$ opens the transmission gate $98_2$ and is supplied to the set terminal of the flip-flop $100_2$ to set it. Thus, the flip-flop $100_2$ outputs the output request signal ORQ2 of high level.

On the other hand, if both bits of the channel data 52 are logic high level, pulse 166 of the signal SL1 of logic high level and pulse 168 of the signal SL2 of logic high level are applied to the AND gates 94 and 96, respectively, and the signals ORQ1 and ORQ2 of high lvel are output from the flip-flop $100_1$ and $100_2$, respectively. If the time coincidence is not detected and the MEQU signal is logic low level, the flip-flops $100_1$ and $100_2$ are not set, as has been described hereinbefore.

Figure 10:
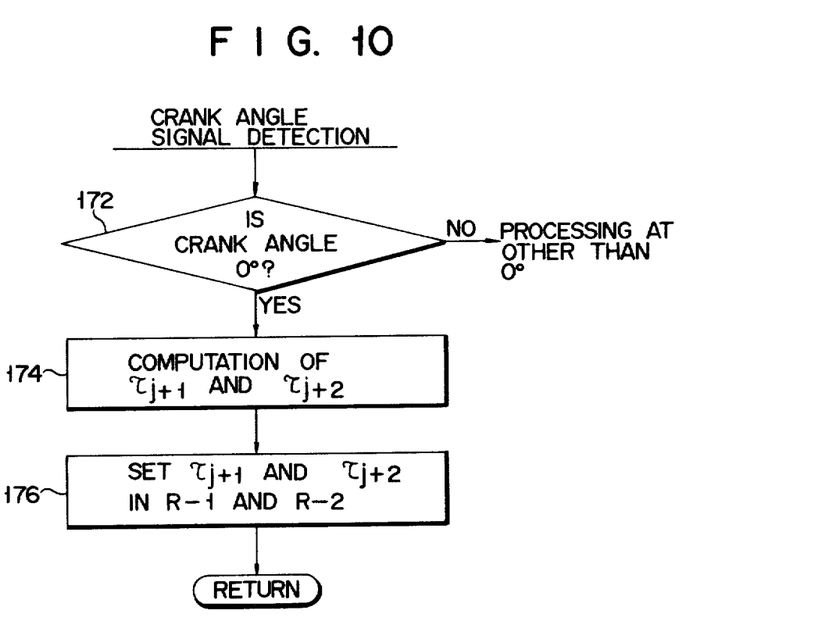
FIG. 10 is a flow chart showing the procedure for processing upon detection of a crank angle signal in the case of engine control according to the present invention.
Figure 11:
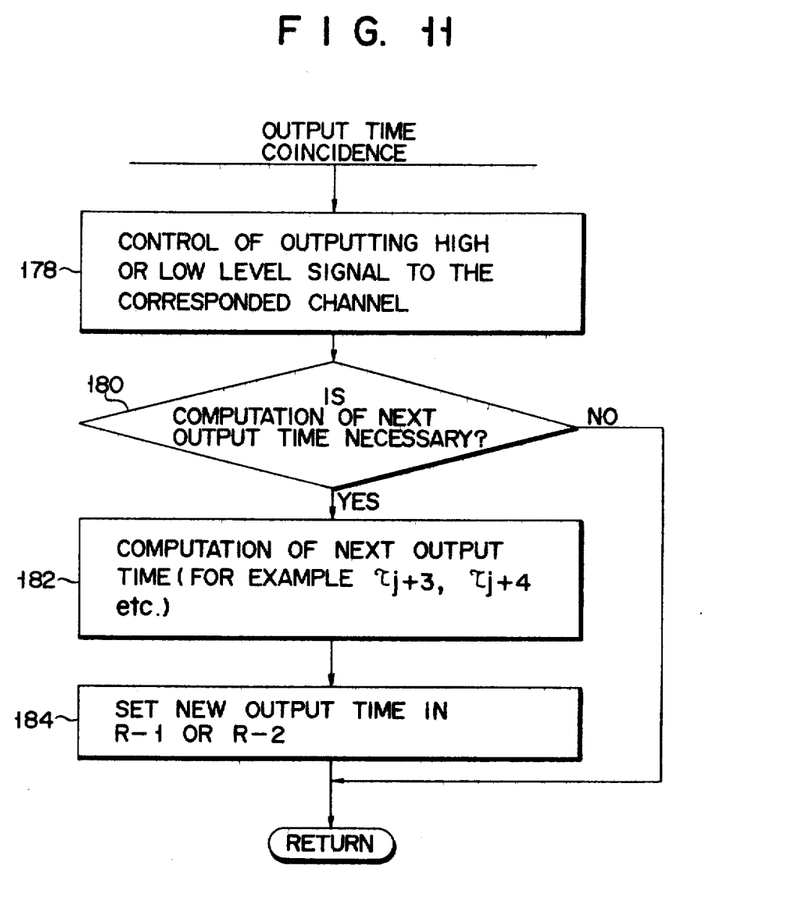
FIG. 11 is a flow chart showing the procedure for processing upon coincidence of the absolute time measured with a timer and the output time of a control signal in the case of engine control according to the present invention.

FIGS. 10 and 11 are flow charts of the preferred embodiment of the present invention, corresponding to FIGS. 4 and 5 of the prior art which show flow charts for detection of the crank angle signal and processing upon the coincidence of the output times, respectively.

For detecting the crank angle signal, in STEP 172, a judgment is made as to whether or not the crank angle signal indicates 0°. If the crank angle signal indicates 0°, the program advances to STEP 174 to calculate the output times $\tau_{j+1}$ and $\tau_{j+2}$. The processing is completed in STEP 176 by setting the times $\tau_{j+1}$ and $\tau_{j+2}$ in registers R1 and R2.

According to the processing upon the detection of the output times, as shown in FIG. 11, first in STEP 178, a signal of logic high or low level is output to the corresponding channel. Next in STEP 180, a judgment is made as to whether or not the calculation of the next output times is necessary. If so, the program advances to STEP 182 where the calculation of the next output times is performed; for example, the calculation of the times $\tau_{j+3}$ and $\tau_{j+4}$ is performed. In STEP 184, the new output time is set in the register R1 or R2.

As may be apparent from the above description, since the respective output times are already stored in the registers R1, R2, RR1 and RR2, queuing of the output times is not necessary. Similarly, as for the queuing of the commands, it suffices that only the distinction is memorized as to whether the output signal of each channel is to be made high or low at the next output time, and it is not necessary to stack the commands in a particular order. Furthermore, the registers R1, R2, RR1 and RR2 may be used as general-purpose workareas by controlling the mask bit. When data such as "1", "1" is stored in the channel designating region of the register RR1, the output requests of both channels may be simultaneously obtained. Therefore, if the output time data is set in the registers R1 and RR1 and the channel designating data is set in the register RR1 for setting channel 1, the output signals ORQ1 may be obtained twice within an interval shorter than the cycle time of the CPU so that the precision control of the engine may be performed.

What is claimed is:

1. An output control device for requesting output control signals on a plurality of output channels, comprising:
   (A) storing means for storing output time data designating the desired time to produce an output control signal and mask data designating whether said storing means is dedicated for use as a register which holds said output time data or is free to be used as working random access memory;
   (B) first means connected to said storing means for retrieving said mask data and said output time data stored in said storing means;
   (C) a timer for producing a value representative of absolute time;
   (D) comparing means connected to said timer and said storing means for comparing the contents of said timer with said output time data retrieved by said first means and for issuing a coincidence detection signal in response to a coincidence of the contents of said timer and said retrieved output time data; and
   (E) second means connected to said storing means and said comparing means for determining whether to use said storing means as a register which holds said output time data or as a working random access memory in response to said mask data.

2. An output control device for requesting output control signals on a plurality of output channels, comprising:
   (A) storing means for storing output time data designating the desired time to produce an output control signal, mask data designating whether said storing means is dedicated for use as a register which holds said output time data or is free to be used as working random access memory, and channel designating data designating the output channels on which an output signal is desired;
   (B) first means connected to said storing means for retrieving said output time data, said mask data, and said channel data stored in said storing means;
   (C) a timer for producing a value representative of absolute time;
   (D) comparing means connected to said timer and said storing means for comparing the contents of said timer with said output time data retrieved by said first means and for issuing a coincidence detection signal in response to a coincidence of contents of said timer and said retrieved output time data;
   (E) second means connected to said storing means and said comparing means for determining whether to use said storing means as a register which holds said output time data or as a working random access memory in response to said mask data; and
   (F) third means connected to said storing means and said second means for requesting an output signal at an output channel designated by said channel designating data when said second means has determined to use said storing means as a register.

3. An output control device for requesting output control signals on a plurality of output channels, comprising:
   (A) first storing means for storing output time data designating the desired time to produce an output control signal and mask data designating whether said storing means is dedicated for use as a register which holds said output time data or is free to be used as working random access memory for use on predetermined output channels;
   (B) a second storing means for storing said mask data, said output time data, and output channel data designating the output channel on which an output signal is desired;
   (C) first means connected to said first and second storing means for retrieving said mask data and said output time data stored in said first and second storing means;
   (D) a timer for producing a value representative of absolute time;
   (E) comparing means connected to said timer for comparing the contents of said timer with said output time data retrieved by said first means and for issuing a coincidence detection signal in response to a coincidence of contents of said timer and said retrieved output time data;
   (F) second means connected to said first and second storing means and said comparing means for determining whether to use said first and second storing means as registers which hold output time data or as working random access memories in response to said mask data; and
   (G) third means connected to said first and second storing means and said second means for determining whether to request an output signal at an output channel bearing a fixed relationship to said first storing means or at an output channel designated by said channel designating data when said second means has determined to use said first and second storing means as registers.

4. An output control device according to claim 1, wherein said storing means comprises a plurality of registers.

5. An output control device according to claim 1, wherein said first means retrieves data in said storing means on a time-sharing basis.

6. An output control device according to claim 2, wherein said storing means comprises a plurality of registers.

7. An output control device according to claim 2, wherein said first means retrieves data in said storing means on a time-sharing basis.

8. An output control device according to claim 3, wherein said first and second storing means comprise a plurality of registers.

9. An output control device according to claim 3, wherein said first means retrieves data in said first and second storing means on a time-sharing basis.

10. An output control device which can be used in a digital processing system, which can be connected to a data bus of said system, and which is responsive to clock pulses, comprising:
(A) a data bus;
(B) means for receiving and storing output time data designating the desired time to produce an output control signal and mask data designating whether said storing means in dedicated for used as a register which holds said output time data or is free to be used as working random access memory, from said data bus in response to signals on said data bus;
(C) gate means connected to said storing means for controlling transfer of said mask data and said output time data from said storing means;
(D) gate control means connected to said gate means for supplying a switching control signal to said gate means in response to clock pulses to thereby retrieve data in said storing means;
(E) counting means connected to said storing means and to said data bus for counting at a rate determined by clock pulses;
(F) comparing means connected to said counting means and to said storing means for generating a coincidence signal in response to a coincidence of contents of said counting means and said output time data; and
(G) means connected to said counting means and said storing means for determining whether to use said storing means as a register which holds said output time data or as a working random access memory in response to a coincidence of contents of said counting means and said output time data.

11. An output control device which can be used in a digital processing system, which can be connected to a data bus of said system, and which is responsive to clock pulses, comprising:
(A) a data bus;
(B) means for receiving and storing output time data designating the desired time to produce an output control signal, mask data designating whether said storing means is dedicated for use as a register which holds said output time data or is free to be used as working random access memory, and channel designating data designating the output channels on which an output signal is desired from said data bus, said means receiving and storing all of said data from said data bus in response to signals on said data bus;
(C) first gate means connected to said storing means for controlling transfer of said mask data, said channel designating data and said output time data from said storing means;
(D) gate control means connected to said first gate means for supplying a switching control signal to said gate means in response to clock pulses to thereby retrieve data in said storing means;
(E) counting means connected to said storing means and to said data bus for counting at a rate determined by clock pulses;
(F) comparing means connected to said counting means and to said storing means for generating a coincidence signal in response to a coincidence of contents of said counting means and said output time data;
(G) means connected to said counting means and said storing means for determining whether to supply a coincidence signal output from said comparing means to a selecting means to be described later, in response to a coincidence of contents of said counting means and said output time data;
(H) selecting means connected to said storing means and to said gate control means to which are input said channel designating data and a signal output from said gate control means, and which outputs said channel designating data or said signal output from said gate control means in response to a select signal from said gate control means;
(I) second gate means for outputting data output from said selecting means in synchronism with output of said coincidence signal; and
(J) flip-flops connected to said second gate means for holding data output from said second gate means.

12. An output control device which can be used in a digital processing system, which can be connected to a data bus of said system, and which is responsive to clock pulses, comprising:
(A) a data bus;
(B) first storing means for receiving and storing output time data designating the desired time to produce an output control signal and mask data designating whether said storing means is dedicated for use as a register which holds said output time data or is free to be used as working random access memory, from said data bus in response to signals on said data bus;
(C) second storing means for receiving and storing said mask data, channel designating data designating the output channels on which an output signal is desired, and said output time data from said data bus in response to signals on said data bus;
(D) first and second gate means connected to said first and second storing means for controlling transfer of said mask data, said channel designating data, and said output time data output from said first and second storing means;
(E) gate control means connected to said first and second gate means for supplying a switching control signal to said first and second gate means in response to clock pulses to thereby retrieve data in said first and second storing means;
(F) counting means connected to said first and second storing means and to said data bus, for counting at a rate determined by clock pulses;
(G) comparing means connected to said counting means and said first and second storing means for generating a coincidence signal in response to a coincidence of contents of said counting means and said output time data;
(H) means connected to said first and second storing means, said comparing means, and selecting means to be described later, for determining whether or not to supply a coincidence signal output from said comparing means to selecting means to be described later, in response to said mask data;
(I) selecting means connected to said first and second storing means and to said gate control means, to which are input said channel designating data and a signal output from said gate control means, and which outputs said channel designating data or said signal output from said gate control means in response to a select signal from said gate control means;

(J) second gate means for outputting data output from said selecting means in synchronism with output of said coincidence signal; and (K) flip-flops connected to said second gate means for holding data output from said second gate means.

13. An output control device according to claim 10, wherein said storing means comprises a plurality of registers.

14. An output control device according to claim 10, wherein said gate control means supplies a switching control signal to said gate means for retrieving data in said storing means on a time-sharing basis.

15. An output control device according to claim 11, wherein said storing means comprises a plurality of registers.

16. An output control device according to claim 11, wherein said gate control means supplies a switching control signal to said gate means for retrieving data in said storing means on a time-sharing basis.

17. An output control device according to claim 12, wherein said first and second storing means comprise a plurality of registers.

18. An output control device according to claim 12, wherein said gate control means supplies a switching control signal to said first and second gate means for retrieving data in said first and second storing means on a time-sharing basis.

19. An output control device according to claim 1, further comprising a data bus to which is connected said storing means.

20. An output control device according to claim 1, 2 or 3, wherein said first means comprises a shifter for sequentially outputting control signals for storing data in said registers in response to input of externally generated clock pulses.

21. An output control device according to claim 1, 2 or 3, wherein said second means comprises a gate.

22. An output control device according to claim 2 or 3, wherein said third means comprises:

a selector connected to said first means and to said storing means, to which are input said channel designating data and a signal output from said first means, and which outputs said channel designating data or said signal output from said first means in response to a select signal from said first means;

gates connected to said selector for outputting data output from said selector in synchronism with time coincidence detection data output from said comparing means; and flip-flops connected to said gates for holding data output from said gates.

* * * * *

UNITED STATES PATENT AND TRADEMARK OFFICE
CERTIFICATE OF CORRECTION

PATENT NO. : 4,451,897
DATED : May 29, 1984
INVENTOR(S) : Yutaka MURAO

It is certified that error appears in the above—identified patent and that said Letters Patent is hereby corrected as shown below:

In Claim 20, Column 18, line 9, change "registers" to -- storing means --.

Signed and Sealed this

Sixth Day of May 1986

[SEAL]

Attest:

DONALD J. QUIGG

Attesting Officer

Commissioner of Patents and Trademarks